United States Patent
Dolganow et al.

(10) Patent No.: US 9,686,137 B2
(45) Date of Patent: Jun. 20, 2017

(54) METHOD AND SYSTEM FOR IDENTIFYING AN OUTGOING INTERFACE USING OPENFLOW PROTOCOL

(71) Applicants: Alcatel-Lucent USA Inc., Murray Hill, NJ (US); Alcatel-Lucent Canada Inc., Ottawa (CA)

(72) Inventors: Andrew Dolganow, Ottawa (CA); Jayant Kotalwar, Cupertino, CA (US); Jaishal Shah, Fremont, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 58 days.

(21) Appl. No.: 14/618,985

(22) Filed: Feb. 10, 2015

(65) Prior Publication Data
US 2016/0234067 A1   Aug. 11, 2016

(51) Int. Cl.
| | |
|---|---|
| H04L 12/24 | (2006.01) |
| H04L 12/851 | (2013.01) |
| H04L 12/46 | (2006.01) |
| H04L 12/755 | (2013.01) |
| H04L 12/715 | (2013.01) |

(52) U.S. Cl.
CPC ...... H04L 41/0826 (2013.01); H04L 12/4645 (2013.01); H04L 41/0813 (2013.01); H04L 45/021 (2013.01); H04L 45/64 (2013.01); H04L 47/2483 (2013.01)

(58) Field of Classification Search
None
See application file for complete search history.

(56) References Cited

U.S. PATENT DOCUMENTS

| | | | |
|---|---|---|---|
| 2012/0044935 A1 | 2/2012 | Hama et al. | |
| 2012/0300615 A1 | 11/2012 | Kempf et al. | |
| 2013/0010600 A1 | 1/2013 | Jocha et al. | |
| 2013/0272135 A1* | 10/2013 | Leong | H04L 41/0823 370/241 |
| 2013/0286824 A1* | 10/2013 | Rangaprasad | H04L 43/026 370/230 |
| 2014/0146674 A1 | 5/2014 | Wang et al. | |
| 2014/0241247 A1* | 8/2014 | Kempf | H04L 12/4633 370/328 |
| 2015/0009831 A1* | 1/2015 | Graf | H04L 47/31 370/236 |
| 2015/0188770 A1* | 7/2015 | Naiksatam | H04L 41/0893 370/254 |
| 2015/0319094 A1 | 11/2015 | Brockbank et al. | |
| 2015/0381428 A1* | 12/2015 | Ong | H04L 41/12 709/223 |
| 2016/0065454 A1 | 3/2016 | Arumugam et al. | |
| 2016/0112328 A1 | 4/2016 | Anand | |

* cited by examiner

*Primary Examiner* — Diane Lo
(74) *Attorney, Agent, or Firm* — Wilson & Ham

(57) ABSTRACT

A method for using OpenFlow protocol to configure an OpenFlow-enabled switch is disclosed. In the embodiment, the method involves decoding an OpenFlow flow entry from a flow mod message, the flow entry including two or more actions, searching a Service Access Point (SAP) match table for an outgoing interface having attributes that match the two or more actions, and updating a flow table on the OpenFlow-enabled switch to include the decoded flow entry when an outgoing interface having attributes that match the two or more actions is found.

13 Claims, 12 Drawing Sheets

| TABLE ID | MATCH FIELD | PRIORITY | COUNTER | ACTION/INSTRUCTIONS | TIMEOUTS | COOKIE |
|---|---|---|---|---|---|---|
| 1 | IN PORT: 2/1/3<br>VID: 4094<br>OUTER VID: 4094 | 7 | — | PORT = 2/1/3<br>OXM_OF_VLAN_VID = 4091<br>OFL_OUT_VLAN_ID =4091 | — | — |
| 2 | IN PORT: LAG-863<br>VID: ANY<br>OUTER VID: 4094 | 11 | — | PORT = LAG-863<br>OXM_OF_VLAN_VID = 4091 | — | — |
| 3 | ... | ... | ... | ... | ... | ... |

| SAP MATCH | OXM_OF_IN_PORT | OXM_OF_VLAN_VID | OFL_OUT_VLAN_ID | COMMENTS |
|---|---|---|---|---|
| port-id<br>lag-id | TmnxPortId for port or LAG | Value: 0x0000<br>Mask: Absent | TLV Absent or encoded as per OXM_OF_VLAN_VID | Mask must be absent |
| port-id:qtag1<br>lag-id:qtag1 | TmnxPortId for port or LAG | Value: 0x1yyy, yyy encodes qtag1, for 7x50 value of "*"<br>Mask: Absent | Must be absent | Mask must be absent |
| port-id:any<br>lag-id:any | TmnxPortId for port or LAG | Value: 0x1000<br>Mask: 0x1000 | Must be absent | Mask must be 0x1000 |
| port-id:qtag1.qtag2<br>lag-id:qtag1.qtag2 | TmnxPortId for port or LAG | Value: 0x1yyy, yyy encodes qtag2, FFF used for 7x50 value of "*"<br>Mask: Absent | Value 0x1zzz, zzz encodes qtag1, FFF used for 7x50 value of "*"<br>Mask: Absent | Mask must be absent |
| port-id:qtag1.any<br>lag-id:qtag1.any | TmnxPortId for port or LAG | Value: 0x1000<br>Mask: 0x1000 | Value 0x1zzz, zzz encodes qtag1, FFF used for 7x50 value of "*"<br>Mask: Absent | Mask must be absent for OFL_OUT_VLAN_VID |
| port-id:any.any<br>lag-id:any.any | TmnxPortId for port or LAG | Value: 0x1000<br>Mask: 0x1000 | Value: 0x1000<br>Mask: 0x1000 | Masks must be 0x1000 |

| | | | |
|---|---|---|---|
| TABLE | : 0 | FLOW PRI | : 10 |
| COOKIE | : 0xC00007E300000000 | CookieType | : SERVICE 2019 |
| CONTROLLER | : 1.3.8.8:6633 | | |
| FILTER HND | : 0x8300000B0000FFF5 | | |
| FILTER V4 | : _tmnx_ofs_ofs:11 ENTRY 65525 | | |
| SAP | : lag-863:4094.4094 | | |
| IN PORT | : 0x5000035f | | |
| VID | : 0x1ffe | OUTER VID | : 0x1ffe |
| ETHTYPE | : 0x0800 | | |
| SRC IP | : * | | |
| DST IP | : * | | |
| IP PROTO | : * | DSCP | : * |
| SRC PORT | : * | DST PORT | : * |
| ICMP TYPE | : * | ICMP CODE | : * |
| LABEL | : * | | |
| ACTION | : FORWARD ON SAP | | |
| | Sap lag-863:4094.4094 | | |
| FLOW FLAGS | : IPv4 | | |
| UP TIME | : 0d 00:02:12 | ADD TS | : 4294965710 |
| MOD TS | : 0 | STATS TS | : 11625 |
| #PACKETS | : 0 | #BYTES | : 0 |

FIG. 10

| | | | |
|---|---|---|---|
| ENTRY | : 65525 | DSCP | : UNDEFINED |
| DESCRIPTION | : (NOT SPECIFIED) | ICMP CODE | : UNDEFINED |
| LOG ID | : N/A | SRC ROUTE OPT | : OFF |
| SRC. IP | : 0.0.0.0/0 | INT. SAMPLING | : ON |
| SRC. PORT | : N/A | MULTIPLE OPTION | : OFF |
| DEST. IP | : 0.0.0.0/0 | TCP-ACK | : OFF |
| DEST. PORT | : N/A | | |
| PROTOCOL | : UNDEFINED | | |
| ICMP TYPE | : UNDEFINED | | |
| FRAGMENT | : OFF | | |
| SAMPLING | : OFF | | |
| IP-OPTION | : 0/0 | | |
| TCP-SYN | : OFF | | |
| OPTION-PRES | : OFF | | |
| MATCH ACTION | : FORWARD (SAP) ACTIVE SVCID = 2019 | | |
| NEXT HOP | : LAG-863.4094.4094 | | |
| ING. MATCHES | : 0 PKTS | | |
| EGR. MATCHES | : 0 PKTS | | |

FIG. 11

METHOD AND SYSTEM FOR IDENTIFYING AN OUTGOING INTERFACE USING OPENFLOW PROTOCOL

BACKGROUND

OpenFlow-based software-defined networks (SDNs) represent a paradigm shift in network architecture that provides improved switching and flexibility. Accordingly, many traditional network architectures are being replaced with SDN architectures. However, adoption of SDNs in place of traditional networks is often a slow and costly process because, for example, traditional networks and SDNs are not able to fully communicate and packets routed over an SDN pipeline are not easily passed off to a traditional network pipeline and vice versa. In order to reduce the cost and expedite the adoption of SDNs, Hybrid OpenFlow switches have been introduced as a means to facilitate communication between traditional network switches and SDN switches, allowing for more immediate adoption of SDN architectures with lower costs.

SUMMARY

In an embodiment, a method for using OpenFlow protocol to configure an OpenFlow-enabled switch is disclosed. In the embodiment, the method involves decoding an OpenFlow flow entry from a flow mod message, the flow entry including two or more actions, searching a Service Access Point (SAP) match table for an outgoing interface having attributes that match the two or more actions, and updating a flow table on the OpenFlow-enabled switch to include the decoded flow entry when an outgoing interface having attributes that match the two or more actions is found.

In another embodiment, a method for selecting an outgoing interface using an OpenFlow flow entry is disclosed. In the embodiment, the method involves extracting one or more attributes from a flow mod message, comparing the one or more extracted attributes with attributes of interfaces in a SAP match table, and updating a flow table to include an OpenFlow flow entry decoded from the flow mod message when all of the extracted attributes match with all of the attributes of an interface in the SAP match table.

In another embodiment, a non-transitory computer-readable storage medium comprising instructions that, when executed by a computer, implement a method for configuring an OpenFlow-enabled switch. In an embodiment, the method involves decoding an OpenFlow flow entry from a flow mod message, the flow entry including two or more actions, searching a SAP match table on an OpenFlow-enabled switch for an outgoing interface having attributes that match the two or more actions, and updating a flow table on the OpenFlow-enabled switch to include the decoded flow entry when an outgoing interface having attributes that match the two or more actions is found.

Other aspects and advantages of embodiments of the present invention will become apparent from the following detailed description taken in conjunction with the accompanying drawings.

BRIEF DESCRIPTION OF THE DRAWINGS

FIG. 3 depicts a portion of a flow table of an OpenFlow-enabled switch.

FIG. 7 is a template of a SAP match table in accordance with an embodiment of the invention.

FIG. 10 is an example of a flow entry in a human-readable format in accordance with an embodiment of the invention.

FIG. 11 is an example of an entry for insertion into a filter in human-readable format that corresponds to the flow entry of FIG. 10 in accordance with an embodiment of the invention.

Throughout the description, similar reference numbers may be used to identify similar elements.

DETAILED DESCRIPTION

Figure 1:
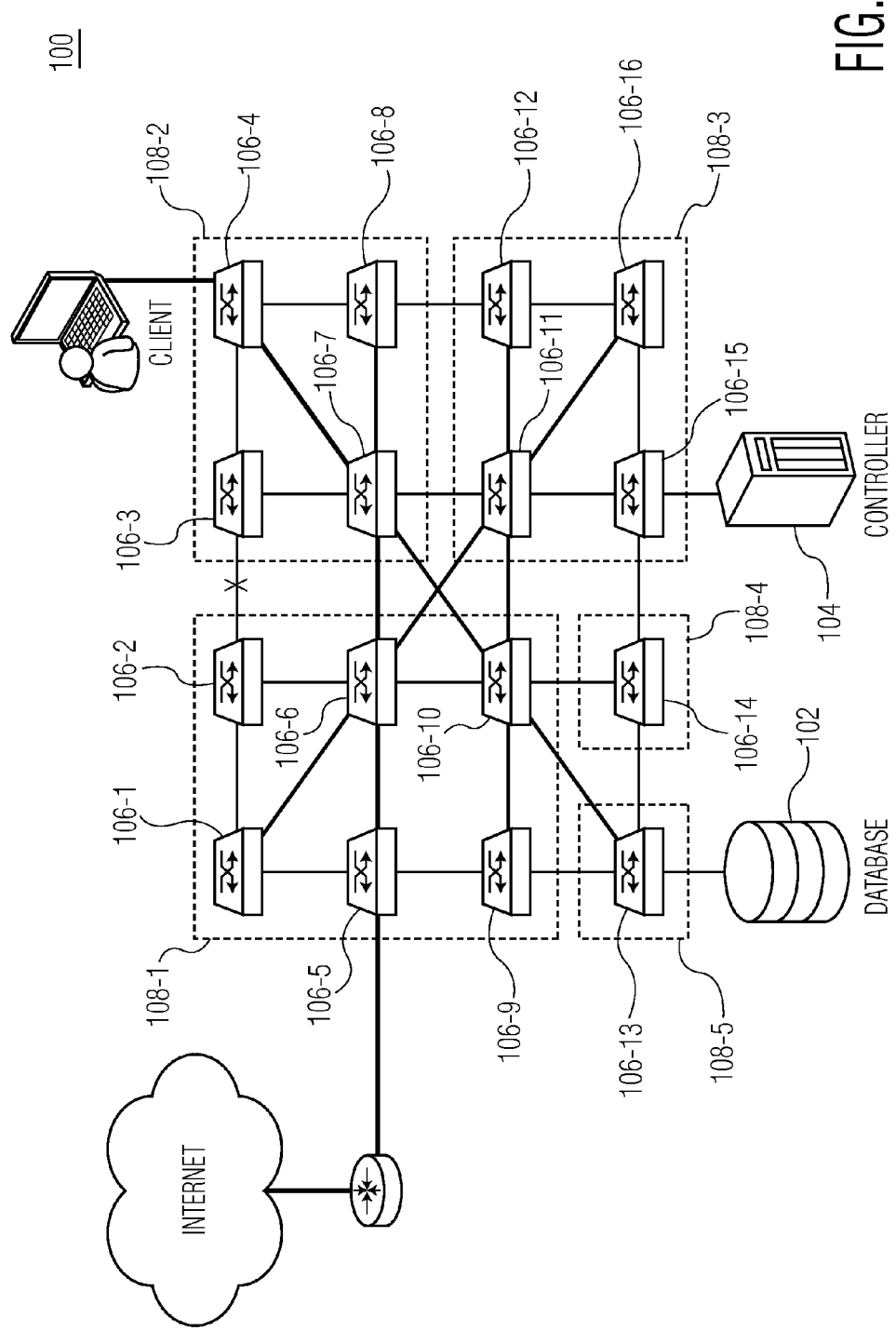
FIG. 1 depicts a communication network that includes an SDN.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Traditional network architectures typically utilize hierarchical tiers of switches to switch packets through a network using various network protocols. The configuration of networks using traditional network architectures (traditional networks) is typically static and reconfiguration of the traditional networks involves reconfiguring each switch in the traditional network. Thus, considerable effort is required to reconfigure a traditional network.

In contrast, software-defined network (SDN) architectures utilize centralized controllers to direct switching of packets across switches in the SDN. The centralized nature of the controller allows for reconfiguration of the SDN by reconfiguring rules of the controller without having to reconfigure each switch in the network as well. Thus, reconfiguring an SDN requires considerably less effort than reconfiguring a traditional network. Since less effort is required to reconfigure, and thus manage, an SDN, SDNs are replacing many traditional networks. To facilitate the replacement process, solutions are needed to allow for management of traditional network hardware and configurations using OpenFlow protocol so that a unified management approach can be taken for both new SDNs and traditional networks that have not yet been replaced.

FIG. 1 depicts a communication network 100 that includes an SDN. In the embodiment of FIG. 1, the SDN includes a database 102, a controller 104, and OpenFlow-enabled switches 106-1-106-16 running on SDN-enabled physical switches 108-1-108-5. In an embodiment, the OpenFlow-enabled switches can be either virtual switches or physical switches that include one or more flow tables and a group table. In an embodiment, a flow table is a table of flow entries that is maintained on an OpenFlow-enabled switch, the flow entries defined by match fields and a priority level. The OpenFlow-enabled switches are interconnected with each other and each OpenFlow switch is further connected to the controller via a secure channel (not shown), which allows for centralized management and configuration of the SDN. When a packet of a new flow enters the SDN at a switch, the switch communicates with the controller over the secure channel to determine how to forward the packet. The controller determines a desired routing path for the new flow, based on routing rules and network topology, and sends a flow mod message to each switch along the desired routing path to configure how each switch forwards packets of the flow. For example, if a packet of a new flow enters the SDN at OpenFlow-enabled switch 106-2 and the controller is configured with a routing rule that prevents OpenFlow-enabled switch 106-2 from directly communicating with OpenFlow-enabled switch 106-3, as indicated by the "X" between switches 106-2 and 106-3, the controller will determine a route for the new flow through the network over a path that does not forward packets from OpenFlow-enabled switch 106-2 to OpenFlow-enabled switch 106-3. The controller can then send flow mod messages to each switch along the desired routing path to configure how each switch forwards packets of the flow. Thus, OpenFlow-enabled switch 106-2 need not be reconfigured to prevent forwarding packets to OpenFlow-enabled switch 106-3 and OpenFlow-enabled switch 106-3 need not be reconfigured to refuse connections from OpenFlow-enabled switch 106-2 because configuration of the controller is sufficient to achieve an acceptable routing path.

Figure 2:
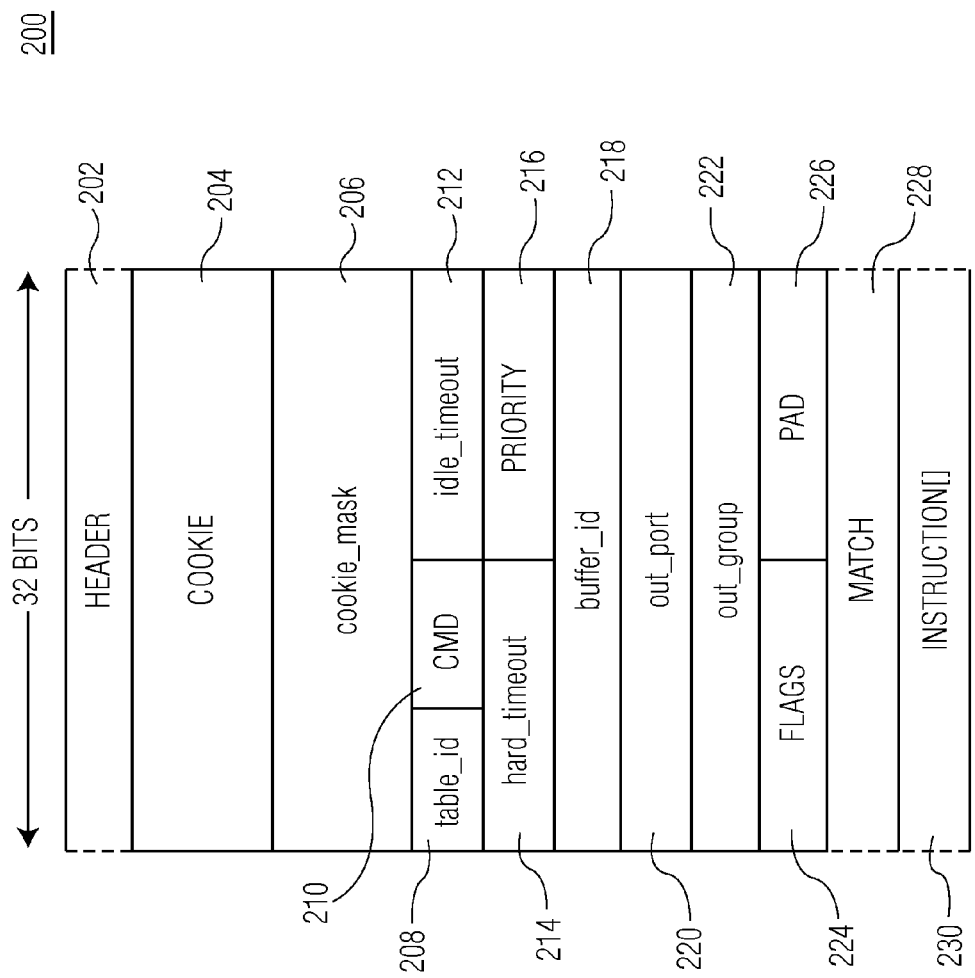
FIG. 2 depicts the structure of a flow mod message.

FIG. 2 depicts the structure of a flow mod message, as defined by OpenFlow protocol version 1.3.1, that is sent from a controller to an OpenFlow-enabled switch to configure how the OpenFlow-enabled switch forwards packets of a flow. As depicted in FIG. 2, the message begins with a standard header field 202 and is followed by a cookie field 204, a cookie_mask field 206, a table_id field 208, a cmd field 210, an idle_timeout field 212, a hard_timeout field 214, a priority field 216, a buffer_id field 218, an out_port field 220, an out_group field 222, a flags field 224, a padding field 226, a match field 228, and an instruction set field 230. The header field, match field, and the instruction set field are indicated with dotted lines to illustrate that the capacity of the fields can expand as needed to accommodate entries in the fields.

An OpenFlow-enabled switch (e.g., a switch that can support OpenFlow protocol and that includes an OpenFlow client) can be configured to forward packets by modifying or adding flow entries to a flow table stored on the OpenFlow-enabled switch. FIG. 3 depicts a portion of a flow table 300 of an OpenFlow-enabled switch. In accordance with the OpenFlow protocol, specifically version 1.3.1 as published by the Open Networking Foundation (OPN) on Sep. 6, 2012, a flow table includes flow entries 302-1-302-n. Components of a flow entry include a match field 304, a match priority field 306, a counter field 308, an actions or instructions field 310, a timeouts field 312, and a cookie field 314. The match field includes one or more match field entries and the actions or instructions field includes one or more actions or instructions. If a packet matches a flow entry, the actions or instructions associated with the flow entry are applied to the matching packet. For example, a packet that arrives on in-port 2/1/3 with an inner VLAN identifier (VID) of 4094 and an outer VID of 4094 will match flow entry 1 in FIG. 3 and the actions associated with flow entry 1 will be applied to the packet.

Figure 4:
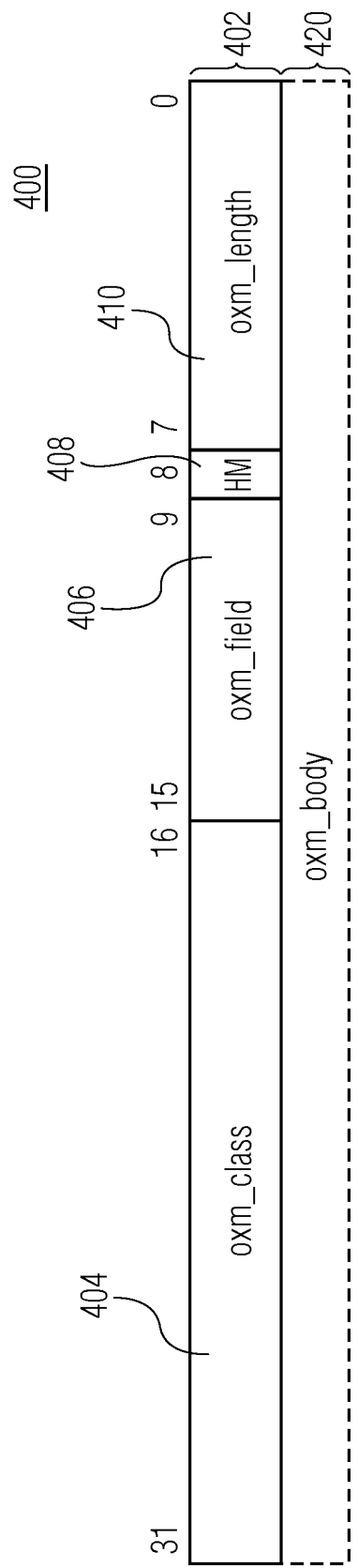
FIG. 4 illustrates the structure of a flow entry in accordance with version 1.3.1 of the OpenFlow specification.

FIG. 4 illustrates the structure of a flow entry 400 in accordance with version 1.3.1 of the OpenFlow specification. According to version 1.3.1 of the OpenFlow specification, the first four bytes of a flow entry form a header 402 that is followed by a body 420 of the flow entry. The header includes an oxm_class field 404, an oxm_field 406, a hasmask field 408, and an oxm_length field 410. The oxm_class field indicates a type of match (e.g., basic matches or experimenter matches), the oxm_field indicates a match sub-type (e.g., incoming port, vlan id, etc.), the hasmask field indicates if the body of the flow entry uses a bitmask, and the oxm_length indicates the length of the body of the flow entry. The body of the flow entry includes the components of a flow entry, as described with reference to FIG. 3, that are formatted using OpenFlow Extensible Match (OXM) format. In an embodiment, each component may include several entries and each entry is formatted using the OXM format. For example, the match fields component can include multiple match field entries (e.g., in-port, VID, and Outer VID) and the actions or instructions can include multiple actions (e.g., set port, set VLAN ID, set outer VLAN ID).

Figure 5:
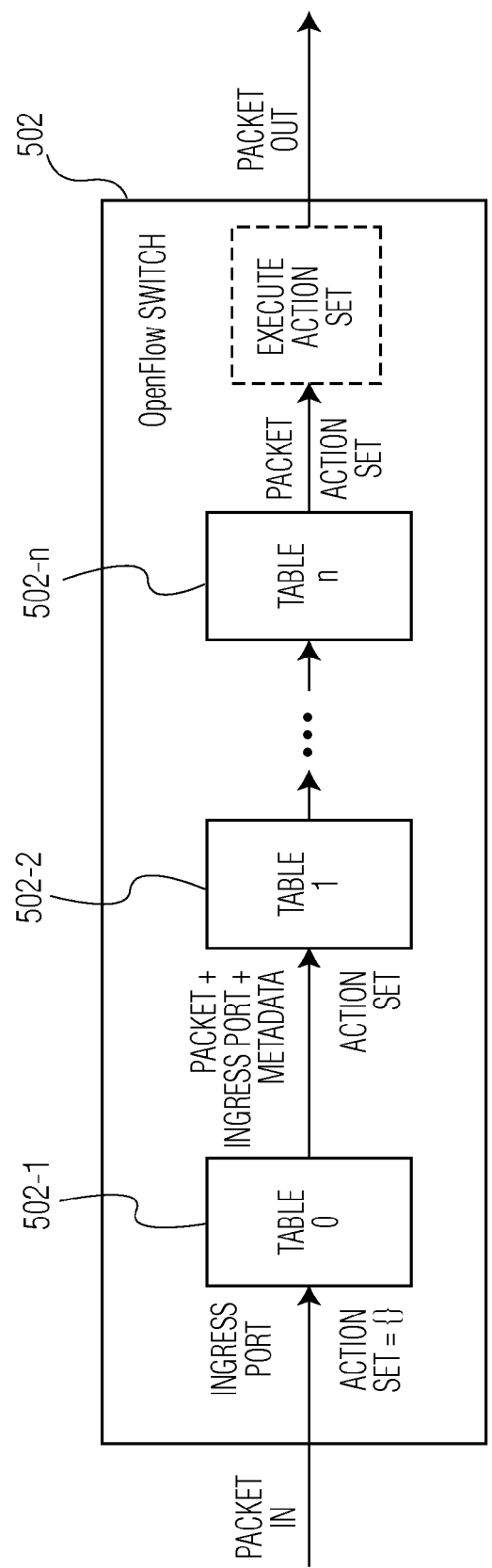
FIG. 5 illustrates a process by which an OpenFlow-enabled switch determines if a packet matches a flow entry in a flow table.

An OpenFlow-enabled switch can determine if a packet matches a flow entry in a flow table by comparing relevant information from the packet (e.g., input port, destination address, etc.) with the match fields in each entry in a flow table stored on the OpenFlow-enabled switch. FIG. 5 illustrates a process by which an OpenFlow-enabled switch 506 determines if a packet matches a flow entry in a flow table. In an embodiment, a flow table may include several sequentially numbered sub-tables 502-1-502-n and each sub-table includes several flow entries (not shown). When a packet is received by an OpenFlow-enabled switch for processing, an OpenFlow client on the OpenFlow-enabled switch extracts information from the packet and generates a match field for the packet by encoding the extracted information using the OXM format. The match field for the packet is then compared with the match fields of flow entries in the flow table, starting with entries in the first sub-table. Depending on the outcome of the comparisons, the match field of the packet may be compared to match fields of flow entries on subsequent sub-tables. If the match field of the packet matches the match fields of a flow entry in a sub-table, then actions or instructions associated with the flow entry may be performed on the packet. Instructions include, for example, manipulations that result in changes to the packet, changes to an action set of the packet, or changes to the processing of the packet (e.g., jump ahead by five sub-tables) and actions include, for example, packet manipulations (e.g., forward the packet to outgoing port 80) as defined by version 1.3.1 of the OpenFlow protocol. In the embodiment of FIG. 5, a packet flows into the OpenFlow-enabled switch through an ingress port with an empty set of actions and the OpenFlow-enabled switch begins performing comparisons between the packet and flow entries, starting with flow entries in the lowest numbered sub-table (table 502-1). In an embodiment, if no matching flow entry is found, the switch is configured to continue searching the next sub-table (e.g., table 502-2) for a match. The switch continues searching sub-table flow entries until a matching flow entry is found and, once the matching flow entry is found, instructions and actions associated with the flow entry are performed on the packet. Once the instructions (e.g., jump to a subsequent table and continue searching for a matching flow entry) and actions (e.g., set a header field of the packet) have been performed on the packet, the packet is forwarded to an outgoing port. If no actions are associated with the packet or if no matching flow entry is found, the packet is dropped and not forwarded.

When a packet is received from a new packet flow and forwarded up to a controller for processing or when, for example, a network administrator manually creates rules for a new packet flow, the controller sends an OXM formatted message (flow mod message) to relevant switches in the SDN that directs the switches to add or modify a flow entry in a flow table to handle packets from the new packet flow. The message determines what match fields the flow entry should have and what action should be taken if a match occurs. The OpenFlow specification defines what type of information can be in match fields (e.g., switch input port, VLAN id, TCP source port, IPv4/IPv6 source address, IPv4/IPv6 destination address, etc.) and defines what actions can be performed (e.g., forward a packet to a port, drop a packet, push or pop a tag, etc.). Thus, when a rule is developed in a controller, the rule is developed using the fields and actions that are defined in the OpenFlow specification, which are then encoded using the OXM format and sent to the relevant switches.

In an embodiment, rules can be developed based on many characteristics of a packet such as incoming port, the IP address format, or the Ethernet type. However, developing rules based on interfaces is not supported because the OpenFlow specification does not support interfaces (as distinct from flows). In an embodiment, an interface is a logical representation of physical and/or virtual network port and a protocol attribute and can be used to create partitions or divisions to control where packets can be forwarded or broadcasted in a network. Examples of interfaces include an access interface identified by a port and an Ethernet tag (e.g., dot1Q, NULL, QinQ, etc.), a segment routing tunnel identified by a set of multiprotocol label switching (MPLS) labels, and a network interface identified by an interface name and an IPv4/6 address. Other interfaces may include interfaces defined, at least in part, by asynchronous transfer mode (ATM) virtual path identifiers (VPIs) and/or virtual circuit identifiers (VCIs) and/or a frame relay (FR) direct link connection identifier (DLCI). In another embodiment, an interface can be Ethernet Physical port or Logical Port such as a LAG or multi-chassis (MC)-LAG or Ethernet G.8031 tunnel or Ethernet g.8032 ring or any other interface identified by a node-specific logical port and a combination of VLAN tags. Interfaces are configured or initialized differently depending on the type of interface. For example, a vlan interface is configured by assigning a VLAN ID to a port and recording the assignment in a vlan database on a switch (e.g., 2/1/3.4094), while a link aggregation group (lag) interface is configured by grouping several ports together for parallel throughput (e.g., lag-863). Once configured, an interface can be addressed by using an interface identifier (e.g., eth0, vlan2, or vpn1). For example, to send packets out over several ports grouped together in a lag, the packets can be forwarded to the lag rather than to each port individually. Because the OpenFlow protocol does not directly support interfaces (e.g., does not support match fields that will match on an interface name or ID), OXM formatted messages sent by a controller to an OpenFlow-enabled switch to direct the switch to perform actions involving interfaces are not directly supported. In a pure OpenFlow switch, the lack of direct support for actions being performed that directly reference interfaces is insignificant because interfaces are not supported on pure OpenFlow switches. However, the lack of direct support for actions being performed that directly reference interfaces is a significant hindrance to management of other OpenFlow-enabled switches that utilize interfaces. Typically, in order to identify an interface or perform actions involving interfaces using the OpenFlow specification, numerous rules are used to process and bridge a packet in order to achieve a result similar to when a rule identifies an interface or performs actions involving interfaces. The numerous rules can make management of an OpenFlow hybrid switch, such as managing interface-based entries of an Access Control List (ACL) filter, tedious and difficult.

In accordance with an embodiment of the invention, a method for using OpenFlow protocol to configure an OpenFlow-enabled switch is disclosed. In an embodiment, the method involves decoding an OpenFlow flow entry from a flow mod message, the flow entry including two or more actions, searching a Service Access Point (SAP) match table on for an outgoing interface having attributes that match the two or more actions, and updating a flow table on the OpenFlow-enabled switch to include the decoded flow entry when an outgoing interface having attributes that match the two or more actions is found. Accordingly, a flow entry that will forward packets to a particular outgoing interface can be added to a flow table. Thus, an OpenFlow-enabled switch can be managed via an OpenFlow controller using attributes extracted from actions in an OpenFlow flow entry, which limits the number of flow entries or rules included in a flow table and reduces the amount of programming needed.

Figure 6:
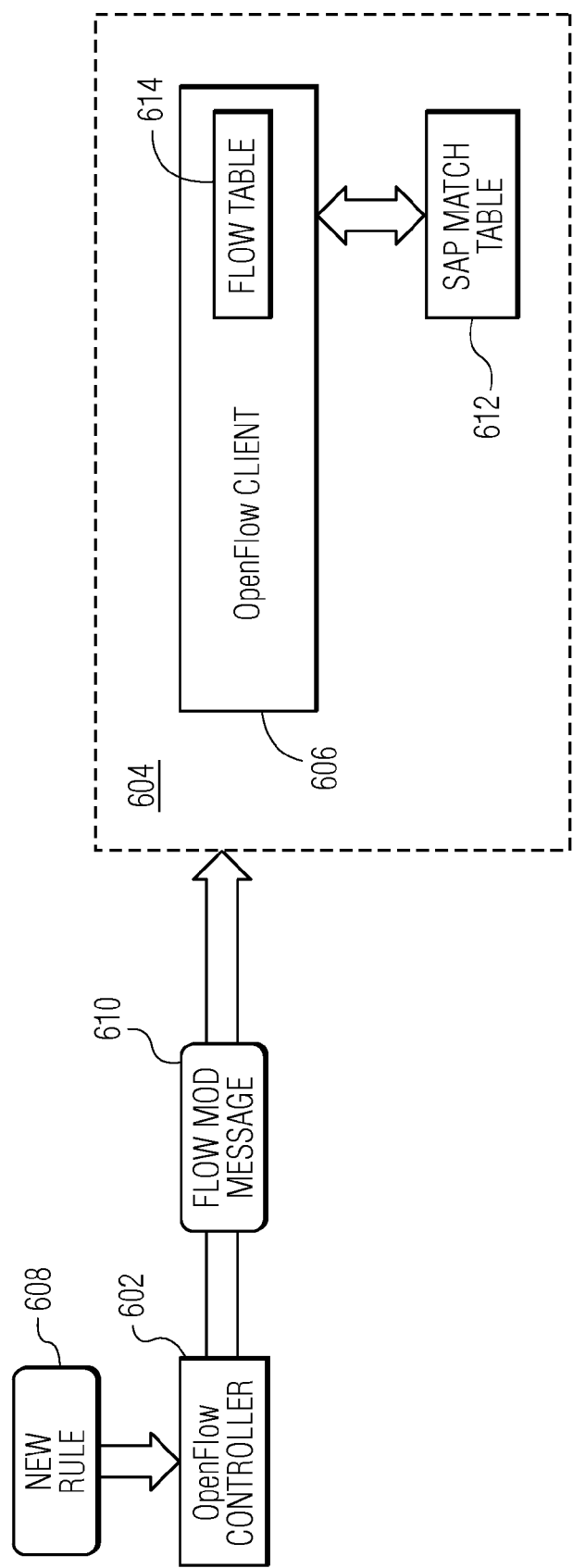
FIG. 6 illustrates an embodiment of a technique for updating an OpenFlow table in accordance with an embodiment of the invention.

FIG. 6 illustrates an embodiment of a technique for updating an OpenFlow table in accordance with an embodiment of the invention. In the illustration of FIG. 6, an OpenFlow controller 602 and an OpenFlow-enabled switch 604 running an OpenFlow client 606 are shown. When a new rule 608 (e.g., forwarding packets on a first interface to a second interface) is created at the OpenFlow controller, the OpenFlow controller encodes the new rule in a flow mod message 610 and transmits the flow mod message to one or more OpenFlow-enabled switches, such as the OpenFlow-enabled switch illustrated in FIG. 6. When the OpenFlow-enabled switch receives the flow mod message, the OpenFlow client running on the OpenFlow-enabled switch decodes an OpenFlow flow entry (not shown) from the flow mod message and extracts attributes from actions in the body of the OpenFlow flow entry. In another embodiment, the OpenFlow client can extract attributes directly from the flow mod message and/or from addition fields of the flow mod message (e.g., Ethernet type or other extensions). In an embodiment, two or more attributes are extracted from the actions. Once the attributes are extracted from actions, a SAP match table 612 is searched for an outgoing interface having attributes that match the extracted attributes. If a matching outgoing interface is found, then a flow table 614 on the OpenFlow-enabled switch is updated to include the decoded flow entry. If a matching outgoing interface is not found, then the decoded flow entry is not included in the flow table. In an embodiment, if the decoded flow entry is not included in the flow table, then the decoded flow entry is dropped from memory of the OpenFlow-enabled switch. In an embodiment, the SAP match table is stored locally on the OpenFlow-enabled switch, but could be stored external to the OpenFlow-enabled switch in other embodiments.

FIG. 7 is a template of a SAP match table 700 in accordance with an embodiment of the invention. Each entry 702-1-702-6 in the SAP match table corresponds to an interface and has fields 604 that correspond to attributes that define the interface (e.g., a vlan interface is defined by a port and a vlan tag). In an embodiment, attributes include vlan tags, segment routing tunnels IDs, and physical port IDs. The template indicates information that should be in each field given the attributes used to identify the interface. For example, if the interface is identified by a port ID, a VLAN tag, and an outer VLAN tag, then the OXM_OF_IN_PORT field, the OXM_OF_VLAN_VID field, and the OFL_OUT_VLAN_ID field should include the information indicated by the fourth entry 702-4. The template also includes a comments column 706 that may include further comments regarding configuration of the SAP match table for a given entry. In an embodiment, the SAP match table can utilize other combinations of attribute fields to define interfaces.

Figure 8:
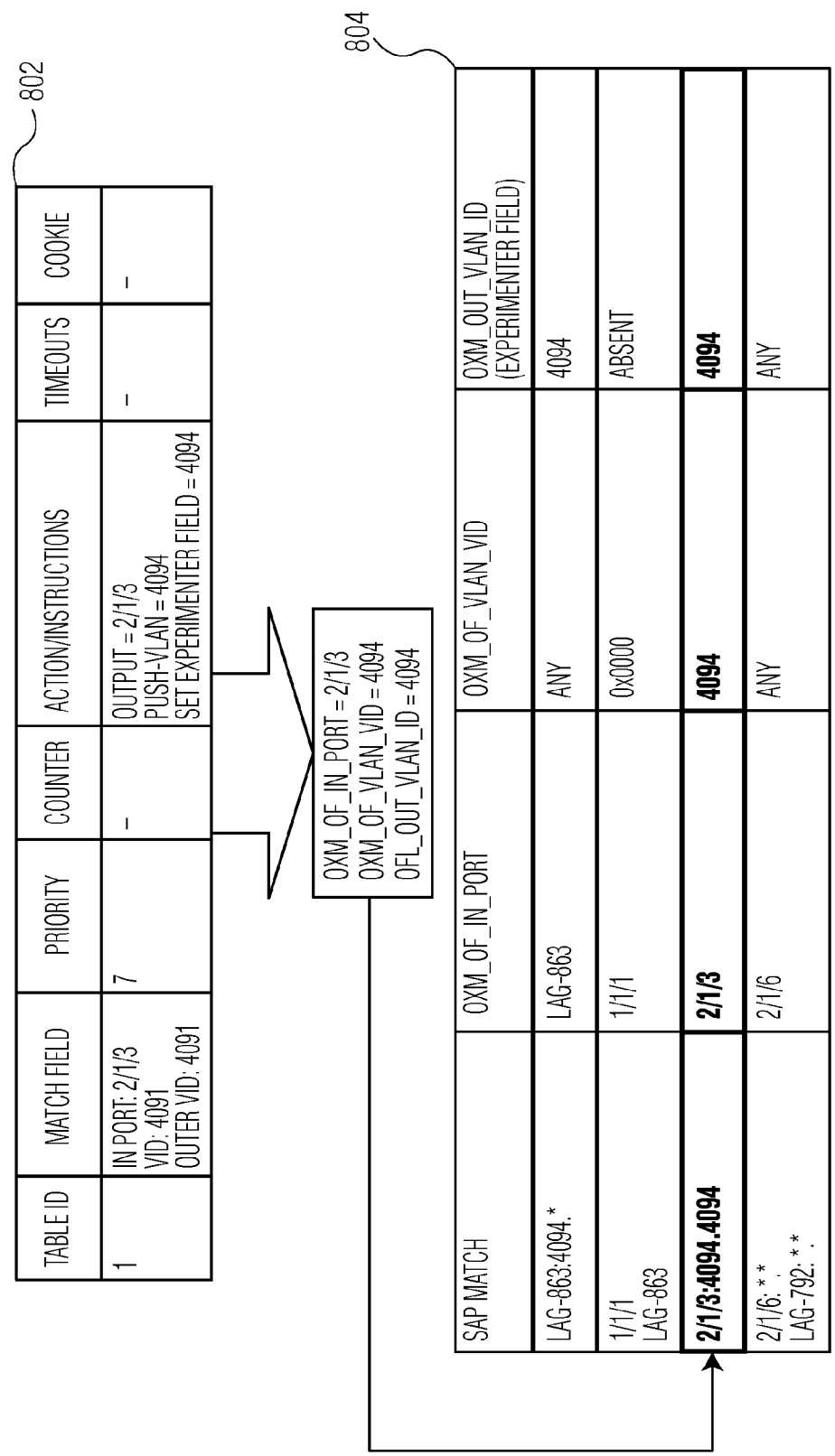
FIG. 8 illustrates searching a SAP match table for an outgoing interface having attributes that match attributes extracted from actions in an OpenFlow flow entry in accordance with an embodiment of the invention.

Using the attribute fields 704 shown in FIG. 7, an outgoing interface can be identified by searching the SAP match table. FIG. 8 illustrates searching a SAP match table for an outgoing interface having attributes that match attributes extracted from actions in an OpenFlow flow entry in accordance with an embodiment of the invention. In an embodiment, the SAP match table is searched for an outgoing interface having all of the attributes identified from the action entries. For example, if the OpenFlow flow entry has an action that forwards a packet to port "2/1/3" and an action that sets a field corresponding to a VLAN tag to "VLAN 1," then an interface with a port attribute of "2/1/3" still may not be selected if the VLAN tag attribute is not set to "VLAN 1." In FIG. 8, a flow entry 802 includes three actions. A first action forwards packets to port 2/1/3, a second action entry sets a field for an inner vlan ID in the flow entry header to 4094, and a third entry sets an experimenter field in the body of the flow entry that is used to indicate an outer vlan ID to 4094. Thus, a port attribute of "2/1/3", an inner vlan attribute of "4094," and an outer vlan attribute of "4094" are extracted from the actions. In the SAP match table 804, the third entry matches all of the attributes extracted from the actions. Thus, a matching outgoing interface is found and the flow table on the OpenFlow-enabled switch is updated to include the OpenFlow flow entry.

Figure 9:
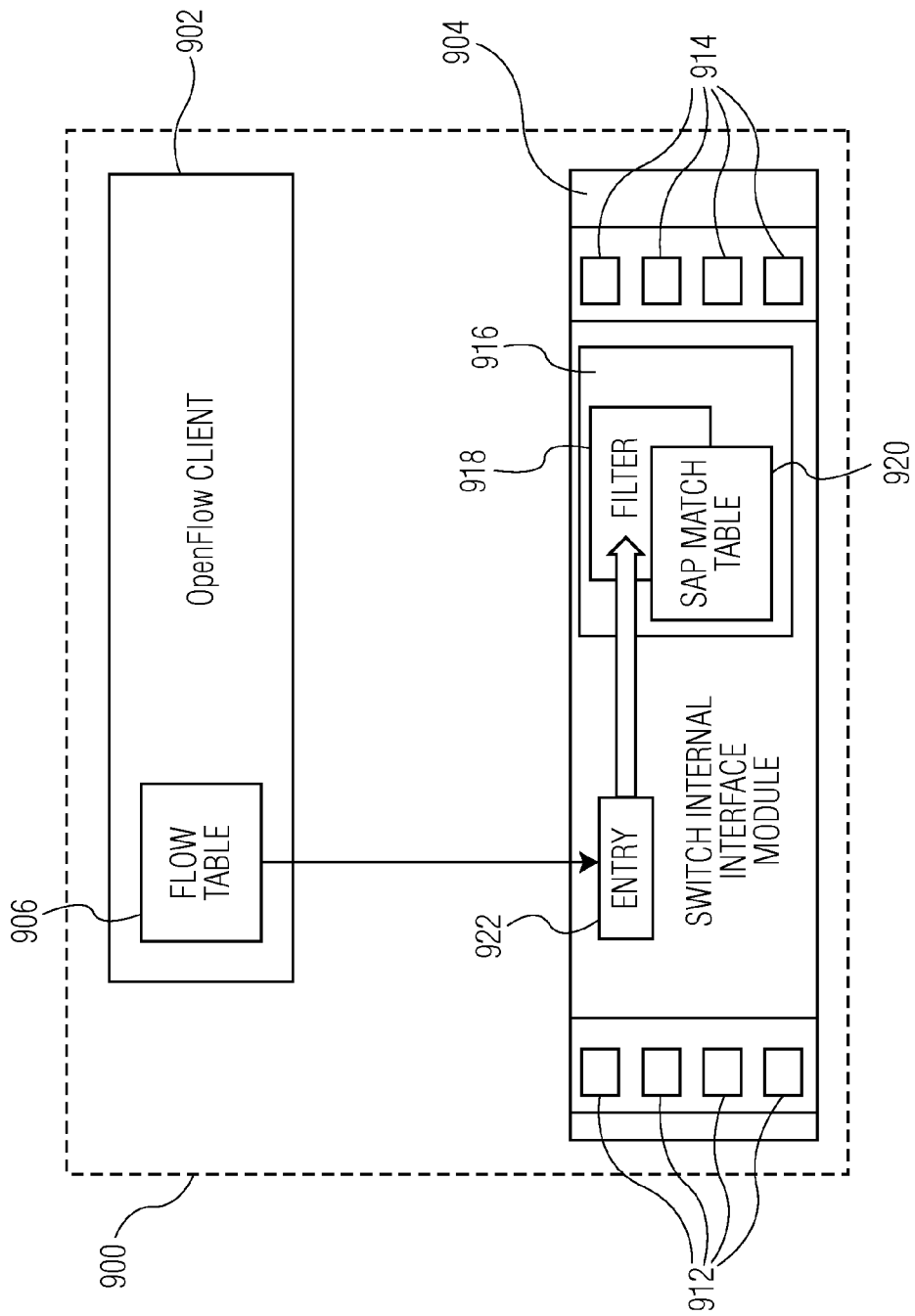
FIG. 9 illustrates the mapping of a flow entry to a filter on an OpenFlow-enabled switch.

In an embodiment, once a flow table has been updated, flow entries in the flow table can be mapped to a filter on the OpenFlow-enabled switch. FIG. 9 illustrates the mapping of a flow entry to a filter on an OpenFlow-enabled switch. In an embodiment, an OpenFlow-enabled switch is an OpenFlow-hybrid switch 900 that utilizes OpenFlow routing methods and traditional routing methods. The OpenFlow-hybrid switch functionality can be divided into OpenFlow functionality and Normal functionality. In an embodiment, OpenFlow functionality is handled by an OpenFlow Client 902 and Normal functionality is handled by a Switch Internal Interface Module 904. In an embodiment, the Switch Internal Interface Module includes the physical hardware of a physical switch such as packet processors, CPUs, buffer memory, switch fabrics, and physical ports (e.g., including port transceivers and port interfaces or connectors). The OpenFlow Client stores a flow table 906 and the Switch Internal Interface Module includes physical ingress ports 912, physical egress ports 914, and tables 916 that include a filter 918, and a SAP match table 920. In an embodiment, a filter can include forwarding tables, forwarding information bases (FIBs), ACLs, bandwidth policy controls, blacklists, firewalls, and/or other lists used to match packets to a corresponding forwarding behavior and can be implemented using ternary content-addressable memory (TCAM). In an embodiment, when a flow entry is inserted into the flow table, the OpenFlow client converts the flow entry into a filter entry 922, and sends the filter entry to the SIIM. The SIIM then maps the filter entry into the filter. Thus, a packet received by the OpenFlow-hybrid switch can be processed by the OpenFlow client using the flow table or processed by the SIIM using the filter since the same forwarding behavior will be performed in either case.

FIG. 10 is an example of a flow entry in a human-readable format in accordance with an embodiment of the invention. In the example, the "In Port" has a value of "0x5000035f," which indicates that flow entry is for LAG interface SAP. The OpenFlow client can process the flow entry to produce an entry for insertion into a filter.

FIG. 11 is an example of an entry for insertion into a filter in human-readable format that corresponds to the flow entry of FIG. 10 in accordance with an embodiment of the invention. In the example, the match action field indicates that packets arriving on service ID 2019 will match the entry and the next hop field indicates that matching packets will be forwarded along via lag-863.4094.4094.

Figure 12:
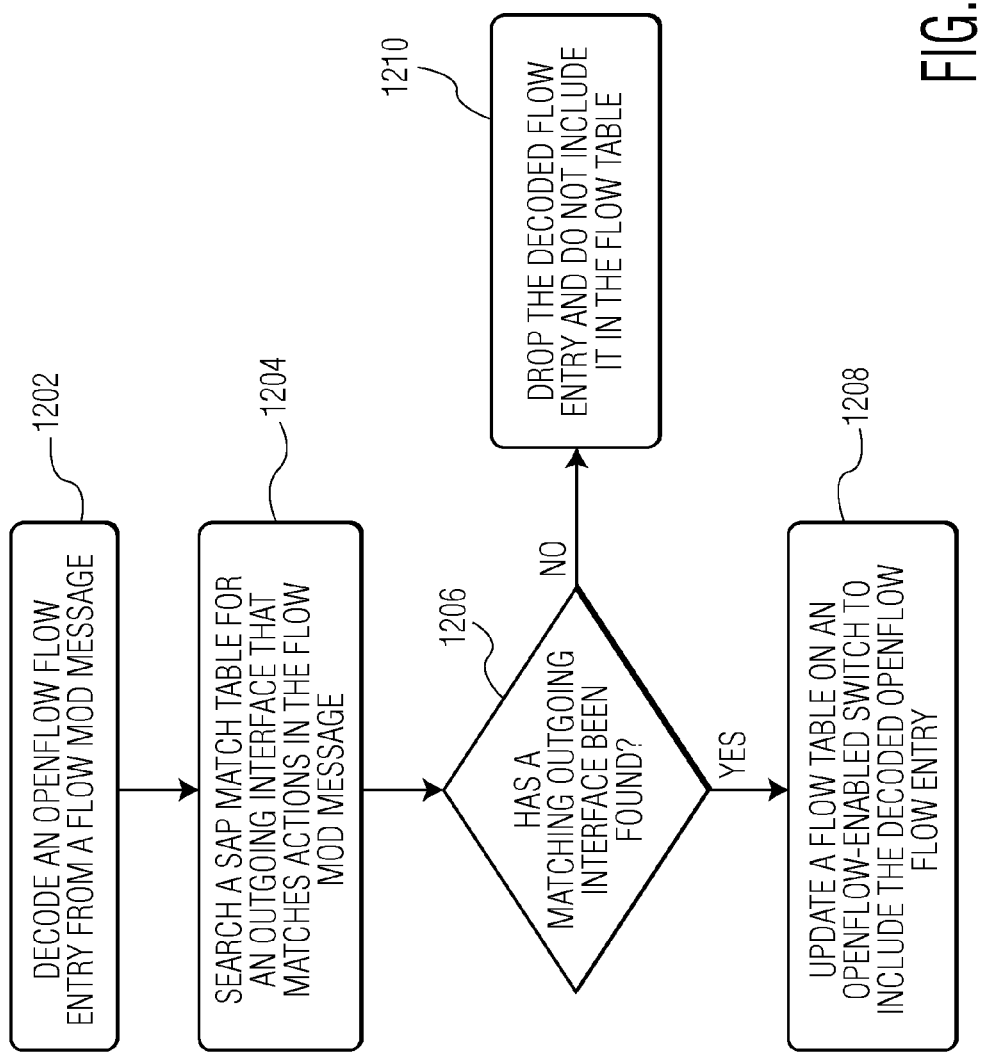
FIG. 12 is a flow chart diagram of a method for using OpenFlow protocol to configure an OpenFlow-enabled switch in accordance with an embodiment of the invention.

FIG. 12 is a flow chart diagram of a method for using OpenFlow protocol to configure an OpenFlow-enabled switch in accordance with an embodiment of the invention. At block 1202, an OpenFlow flow entry is decoded from a flow mod message. In an embodiment, the decoded OpenFlow flow entry includes two or more action. At block 1204, a SAP match table is searched for an outgoing interface having attributes that match the two or more actions. At block 1206, whether a matching outgoing interface has been found is determined. At block 1208, if a matching outgoing interface has been found, then a flow table on the OpenFlow-enabled switch is updated to include the decoded OpenFlow flow entry. At block 1210, if a matching outgoing interface has not been found, then the decoded flow entry is dropped and not included in the flow table.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner. Although Version 1.3.1 of the OpenFlow protocol is described, the above-described technique can be applied to SDNs using other versions (e.g., earlier or later versions) of the OpenFlow protocol or other SDN protocols.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein. In an embodiment, the above-described OpenFlow-switches and OpenFlow controller can include one or more computers that include a processor, memory, and communication interfaces.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for using OpenFlow protocol to configure an OpenFlow-enabled switch, the method comprising:
   decoding an OpenFlow flow entry from a standard flow mod message, the flow entry including two or more actions;
   searching a Service Access Point (SAP) match table for an outgoing interface having attributes that match attributes extracted from the two or more actions; and
   updating a flow table on the OpenFlow-enabled switch to include the decoded flow entry when an outgoing interface having attributes that match the two or more actions is found.

2. The method of claim 1, wherein one or more of the attributes of an outgoing interface is a VLAN tag.

3. The method of claim 1, wherein one or more of the attributes of an outgoing interface is a segment routing tunnel ID.

4. The method of claim 1, wherein one or more of the attributes of an outgoing interface is a physical port ID.

5. A method for selecting an outgoing interface using a standard flow mod message, the method comprising:
   extracting one or more attributes from two or more actions of a standard flow mod message;
   comparing the one or more extracted attributes with attributes of interfaces in a SAP match table; and
   updating a flow table to include an OpenFlow flow entry decoded from the standard flow mod message when all of the extracted attributes match with all of the attributes of an interface in the SAP match table.

6. The method of claim 5, wherein one or more of the extracted attributes is a VLAN tag.

7. The method of claim 5, wherein one or more of the extracted attributes is a segment routing tunnel ID.

8. The method of claim 5, wherein one or more of the extracted attributes is a physical port ID.

9. The method of claim 5, wherein the one or more attributes extracted from the standard flow mod message are extracted from actions in the standard flow mod message.

10. A non-transitory computer-readable storage medium comprising instructions that, when executed by a computer, implement a method for configuring an OpenFlow-enabled switch, the method comprising:
    decoding an OpenFlow entry from a standard flow mod message, the flow entry including two or more actions;
    searching a SAP match table for an outgoing interface having attributes that match attributes extracted from the two or more actions; and
    updating a flow table on the OpenFlow-enabled switch to include the decoded flow entry when an outgoing interface having attributes that match the two or more actions is found.

11. The non-transitory computer-readable storage medium of claim 10, wherein one or more of the attributes of an outgoing interface is a VLAN tag.

12. The non-transitory computer-readable storage medium of claim 10, wherein one or more of the attributes of an outgoing interface is a segment routing tunnel ID.

13. The non-transitory computer-readable storage medium of claim 10, wherein one or more of the attributes of an outgoing interface is a physical port ID.

* * * * *